3,692,537
Patented Sept. 19, 1972

3,692,537
METHOD OF PRODUCING AN EXPANDED POTATO PRODUCT
Dirk R. D'Arnaud Gerkens, Breda, Netherlands, assignor to N.V. Preservenbedrijf, Breda, Netherlands
No Drawing. Continuation-in-part of application Ser. No. 633,700, Apr. 26, 1967. This application Aug. 10, 1970, Ser. No. 62,646
Int. Cl. A23l 1/12
U.S. Cl. 99—100 P         9 Claims

ABSTRACT OF THE DISCLOSURE

Producing an expanded fried potato product wherein raw potatoes are ground to form a liquid slurry, raw starch is added to this slurry, then this slurry is dried and gelatinized on a drum drier to obtain a potato powder, which is then ground to potato flour, low grade potato flour is added to adjust the reducing sugar content and reduce the swelling power, subsequently the resulting potato flour is mixed with water and salt and extruded into bands, which are cut into piecelets and then dried and fried in deep fat to produce a crispy expanded product.

REFERENCE TO PRIOR APPLICATIONS

This application is a continuation-in-part of my co-pending U.S. patent application Ser. No. 633,700, filed Apr. 26, 1967, now abandoned.

PRIOR ART

In U.S. Pat. 2,863,770, there is described a method of making a crispy fried expanded foodstuff comprising extruding a preswelled potato flour containing between 30 and 40% water into strands, drying the strands to a moisture content of between 6 and 10%, cutting the strands into piecelets and frying the piecelets in hot fat. The frying expands the piecelets about five times their original volume to produce a crispy expanded fried foodstuff used as a snack food. Other patents relating to this process are 3,076,711 and 3,131,063.

The potato flour previously used to produce the expanded crispy foodstuff required the use of potatoes having a low reducing sugar content and as high a solid content as possible, which potatoes are not always readily available and usually sell at a premium price. The potato flour was prepared by washing and peeling the potatoes, adding a bleaching agent, cutting the peeled potatoes into small pieces, such as ¼ x ⅛ x 2 inches, blanching the potato pieces to inactivate enzymes and to gelatinize the poato starch, drying the potato pieces with warm air until the moisture content was below about 10%, grinding the dried pieces to 100% —40 mesh, 75% —50 mesh and 50% —70 mesh, mixing the resulting powder with salt and sufficient water to obtain a moisture content between 25 and 40%, preferably about 33%. The mixed potato powder as fed to the extrusion machine is moist to the touch, and of such consistency that with low pressure, such as squeezing in the hand, it will not permanently retain the form in which it has been pressed, but after a short while will lose its coherence (U.S. Pat. 3,131,063, col. 2, lines 55–60); and extruding the preswelled flour under pressure to form the desired strands.

One of the disadvantages of this process was the high loss of solids content in the preparation of the potato flour and the necessity to use potatoes having a reducing sugar content of between 1–2% which were also in demand for making potato chips and therefore of higher prices. In said prior process about 15% by weight of the solids content was lost in the washing and peeling step and another 15% by weight of the solids content was lost during the cutting and washing of the potatoes. Even the sharpest knife destroys a considerable portion of the potato cells, and cell juice and solids content were washed away by rinsing the cut pieces.

The blanching of the cut potatoes performs a dual function; namely, inactivation of enzymes to prevent undesired chemical reactions and gelatinization of the potato starch. The better the gelatinization as long as rectrogradation of the starch is not effected, the higher is the water binding ability of the flour. The blenching purposes were best achieved by using as small potato pieces as possible, high blenching temperatures and long blanching times but solids content losses in the processed potatoes was increased by degradation, by overcooking and by leaching out. Therefore, the blanching process has to balance the two factors and, in practice, the water blanching is effected at about 99° C. for 7 to 9 minutes but solids content loss here is still about 5% by weight.

Care also had to be taken in the air drying step since the water binding properties of the potato flour decrease if the drying temperature is too high and/or if the drying time is prolonged. Preferably, the drying is effected at about 70° C. for approximately four hours to obtain a final moisture content of about 9%.

After grinding the potato powder, which generally has a moisture content of about 9% on wet basis, is mixed with an amount of water such that the water content of the dough is between 28 and 35% on a wet basis. In the water, sufficient salt is dissolved that between 3 and 6%, preferably between 4 and 5% of salt is present calculated on weight of the original potato powder. Other seasoning materials and colors may be added.

The dough is extruded in a press through small orifices for which a pressure of 50 to 100 atmospheres is required. The friction of extrusion causes so much heat, that at least the head of the press must be cooled with running water and some further cooking occurs. The rubber-like bands of dough which are extruded may be cut to desired lengths and are then air-dried at a moderate temperature so that the moisture content of the intermediate product is between 6 and 10%, preferably between 8 and 9%.

This dried, extruded, intermediate material has a hard, horny outer surface and is called the half-material. This half-material may be stored and shipped as desired, provided the moisture content is kept within the specified limits or is restored to the specified limits prior to frying. It is used to produce the final edible product hereinafter descrbied.

For producing the edible product, the half-material is fried in an edible oil for 8 to 20 seconds, the oil being kept at 365 to 400° F. It swells or puffs very appreciably, giving a fried material of weight volume ratio of 0.22 to 0.12, preferably near 0.18, and fat content of between 15 and 25%.

The two more critical properties of the potato flour for a satisfactory expanded foodstuff are the water binding property and the reducing sugar content of the flour. Too low water binding property gives an insufficient expansion during frying and a cookie-like bite to the expanded foodstuff and too high a water binding property makes the dried piecelets and the expanded fried product too hygroscopic and the expanded food product is expanded too much and is too brittle. If the reducing sugar content of the potato flour is too high the expanded formed foodstuff has a brown color and a bitter taste while a reducing sugar content which is too low gives a pale-colored expanded foodstuff. The reducing sugar content is preferably between 0.8 and 2.5%, and in particular between 1 to 2% by weight of the potato flour on a dry basis and this has previously required the use of special grades of potatoes.

OBJECTS OF THE INVENTION

It is an object of this invention to provide an improved process for the production of an expanded foodstuff with low solids content loss and reduced waste waters.

It is another object of the invention to provide a novel process for the preparation of potato flour in which the reducing sugar content and the water binding property can be simply and uniformly controlled.

It is a further object of the invention to provide a process for the preparation of a crispy, expanded foodstuff from a wider variety of raw potatoes.

These and other objects and advantages of the invention will become obvious from the following detailed description.

DESCRIPTION OF THE INVENTION

The improved process of the invention for the preparatiton of a potato flour useful for making crispy, expanded foodstuff comprises washing and peeling potatoes, grinding the potatoes in the presence of a bleaching agent to form a liquid slurry of ground potatoes, adding up to 70% by weight of raw starch, preferably potato starch in amounts from 5 to 70 preferably 25 to 55 parts by weight to 100 parts of the liquid slurry, to the slurry to form a liquid mass having a solids content of 22 to 50%, preferably 35 to 50%, in particular about 45%, drying the liquid mass on a drum drier to obtain a potato pulp having a moisture content of less than 10%, grinding the potato pulp to obtain a potato flour and adjusting the reducing sugar content of the potato flour to about 1 to 2% by weight and the water-binding power by the addition of a low grade potato flour. The resulting potato flour can then be used in the process of U.S. Pat. No. 2,863,770 to make an expanded, crispy fried foodstuff.

By adding raw starch to the potato slurry it is no longer necessary to use potatoes having a reducing sugar content between 1 and 2%. Potatoes having a higher reducing sugar content may be used, and the final reducing sugar content adjusted to within the 1 to 2% range by the amount of raw starch added or potatoes of a lower reducing sugar content may be used and the reducing sugar content adjusted by the addition of a reducing sugar or of a potato product having a sufficiently high reducing sugar content to bring the reducing sugar in the final product to within 1 to 2%. If the intermediate product, or "half material" hereafter referred to is not shipped to warm areas, and is fried shortly after production, the reducing sugar content of the intermediate product can be up to 2.5% on the dry matter content. This material when fried will produce a golden brown colored expanded crispy food product. However, if the intermediate product is to be stored in a warm climate, the reducing sugar content should be below 1%.

The process of the present invention has many advantages over the prior art process. While the prior art blanching of the diced potatoes in a water blancher has the favorable effect of lowering the reducing sugar content, the blanching has the undesirable effect of washing away a considerable proportion of the soluble cell material which decreases the yield of potato flour, adversely affects the taste of the fried product and causes waste water disposal problems. Blanching of large slabs of potatoes which would reduce losses could not be done since the outer layers overcook and become sticky while the inner layers are insufficiently gelatinized. The slicing of the potatoes also causes losses of cell juice and starch during cutting and washing (about 20% of soluble cell content) and increases the waste water disposal problems.

The process of the invention has the advantage over the prior art process, in that the substantial losses which occur in the cutting and washing and blanching of the prior art processes do not occur, since the slurry of potatoes is dried completely on a drum dryer so that there is no loss of starch of cell juice and gelatinization of the potatoes is instantly effected. Moreover, the drying time in the drum dryer is so short that there is not time for oxidative deterioration. The drum dryer effects blanching and drying in one operation and there is no waste water disposal problem since there is no washing or blanching water required. In addition, the potato pulp coming from the drum dryer is thin and soft so that the potato starch may be much more easily ground.

Since in the present process, there is no loss of soluble cell contents, the content of the solubles, when no starch is added, is about twice as high in the dried product of the present process as was present in the prior art process. Also, the reducing sugar content of the dried potato produced by the present process remains the same as it was in the raw potatoes, as long as no starch is added to the slurry, whereas in the prior art process the reducing sugar content was appreciably decreased. Depending upon the reducing sugar content of the original potatoes, the reducing sugar content is adjusted to the desired sugar content by the addition of raw starch to the potato slurry or the addition of reducing sugars. Although potato starch is preferred it adds to the potato taste of the final product, other starches such as cornstarch, tapioca, and the like, may be used. Since the raw starch is not enclosed in cell walls, it will add greatly to the swelling power to the potato powder after the drum treatment, provided there is sufficient water for gelatinization. The potato powder obtained from the drum dryer has a swelling power much greater than that of the prior art process because all the starch is fully gelatinized and is practically free from enclosing cell walls. This potato powder has a swelling power of more than 17 as measured by the modified rehydration factor.

This swelling power of the potato powder is usually too high for use in producing the expanded fried product, since the expanded product would be too brittle and breakage would occur and the expanded product would also absorb moisture too readily. To overcome this, low grade powder is mixed with the ground product from the drum dryer to effect a final adjustment of the reducing sugar content and to adjust the swelling power to the desired level. This gives the process the advantage of being able to always obtain a uniform potato powder regardless of the reducing sugar content and size of the raw potatoes and makes it possible to use as starting material a wide variety of potatoes not previously available for use in these processes.

These potatoes used in the prior art process had to have a certain maximum amount of reducing sugar content and had to be large and of equal size to avoid losses in peeling. The large size potatoes with a low reducing sugar content are the same type of potatoes used by potato chippers and, therefore, potatoes which were not always readily available except at premium prices. The present process has the advantage that any type of potato can be used and, therefore, there is always a ready supply at the prevailing market price.

In a modification of the process of the invention, it is not always necessary to peel the potatoes, provided that the peels are not too thick, since a certain amount of peel fragments can be tolerated. Also, the peel adds more fibre and improves the potato taste of the expanded food product. The more raw starch that is added to the potato slurry, the more peels can be permitted.

The low grade potato flour used to adjust the water-binding or swelling power during frying and to a lesser degree also the reducing sugar content is well known. This low grade potato flour should have a swelling power as measured by the modified rehydration factor of less than 7 although flours with higher swelling power can be utilized. Examples of suitable low grade potato flour are instant potato products, potato flakes and potato flour which are off grade and do not come up to the standards required for making an expanded potato product. Instant potato products and potato flakes of good quality always have a low modified rehydration factor, since starch not enclosed in the cell walls makes the product sticky. These products can be used as an admixture in our process, even if the amount of free starch is too high to make them acceptable as an instant potato product. Also, dried potatoes which have been stored for a long time and which have a relatively high degree of retrograded starch may be ground and added to the potato flour from the drum dryer.

An accurate measure of the suitability of the dried potato powder with respect to the water-binding property for producing the desired puffed end product can be obtained by determining the rehydration factor of the dried powder. This is the quantity of water, which a certain quantity of dried powder can bind, divided by the weight of the powder used in the test.

Good potato powder for producing puffed products can have a rehydration factor or 12 to 15, but the ideal rehydration factor for producing the best puffed product is 8 to 11. Therefore, it is possible to mix the drum-dried product with low grade potato powders in the desired proportions to produce a mixture having a rehydration factor of 6 to 18, preferably 8.5 to 11 and to extrude, dry and fry to produce the best type of puffed end product.

In summary, the present process has the advantages that there is almost a complete freedom of choice in the selection of the raw potatoes used to produce the product; that the approximately 35% loss of potato dry matter in the prior art process is diminished to 15% or less, since the cutting, washing and blanching steps are omitted and a uniform product can be always obtained. Moreover, the waste water problem is practically eliminated. The amount of energy required for the grinding and drum drying is substantially lower than the energy requirements of the prior art process.

I have found that the swelling power of the half material in the hot oil can be accurately measured before hand by measuring the rehydration factor of the ground potato powder. The measurement of the rehydration factor of dried starch materials, i.e., their ability to reabsorb water is described in "Food Dehydration," Wallace Van Arsdel and Michael Copley, the Avi Publishing Co., Inc., 1963, pp. 81–82. The rehydration factor, as there described, is for dried vegetables, meat and potatoes in the form of pieces. For a ground potato, rice, tapioca and corn flour, a modification of this method, developed by me, must be used. The material used in the present invention gives a somewhat modified rehydration factor. The method of measurement is as follows.

MODIFIED REHYDRATION FACTOR TEST

From the dried potato or other powder to be investigated, a portion is sieved and the portion which passes through a sieve 70 mesh and is retained on a sieve 100 mesh is used.

2 grams of this sieved powder are put into a calibrated measuring cylinder with an inner diameter of 1 inch. 40 ml. of tap water of room temperature (20–25° C.) are added, and the mass is stirred with a glass rod, care being taken that no lumps remain. The cylinder is now left quiet for two hours and the swollen potato meniscus is read. This reading, divided by two, is the modified rehydration factor (m.r.f.).

From the "Bintje" variety of Dutch potato (a yellow fleshed potato), several batches of the puffed end product were made by the prior art process, varying only the cut, the blanching-time and temperature and the drying conditions in order to vary the modified rehydration factor of the potato flour; all other conditions were kept constant (e.g. salt content 4.5% on half material with 9% moisture). The results are shown in Table I.

TABLE I

| Batch | M.r.f. | Weight to volume ratio: of puffed final product |
|---|---|---|
| 1 | 2 | ca. 1 |
| 2 | 6 | 0.31 |
| 3 | 9 | 0.18 |
| 4 | 12 | 0.16 |
| 5 | 13 | 0.14 |
| 6 | 17 | 0.12 |
| 7 | 20 | 0.10 |

Although it may seem advantageous to make a product with very low weight to volume ratio, which means a highly puffed product, the practical limitation is that the more the product is puffed, the thinner and thus the more brittle are the material walls. In handling, there is too much breakage and pulverization so that a balance between puffiness and breakability must be maintained.

In marketing, the puffed product is packed in bags by weight. The weight of the contents of a bag is indicated on the bag. Variations in the weight to volume ratio of the product will result in half filled bags up to overfilled bags with broken contents, and a highly puffed, weak product will result in breakage in the bags producing fine crumbled pieces which the customer will reject.

For these reasons, a weight-to-volume ratio of between 0.20 and 0.12 (preferably near 0.18) is preferred. This means that potato powder having an m.r.f. of between 8.5 and 17, preferably near 9.5 should be used as the starting material.

The process of the present invention readily enables the adjustment of the potato powder to within the desired reducing sugars content of from 1 to 2%, based on the dry weight of the powder, and a swelling power as determined by the modified rehydration factor of between 8.5 and 17.

In the following examples, there are described several preferred embodiments to illustrate the invention. However, it should be understood that the invention is not intended to be limited to the specific embodiments.

EXAMPLE I

Field crop potatoes of the Bintje variety containing 22% solids content and 5.4% reducing sugar based on the solids content were washed and lye peeled. The peeled potatoes were then ground in a hammer mill to obtain a thin slurry of finely divided potatoes and sufficient sodium bisulfite was added thereto to obtain an $SO_2$ content of 250 p.p.m. 300 kilos of the said slurry were admixed with 200 kilos of raw potato starch to obtain a mass containing about 50% solids content and which was still transportable by a pump. The said mass was passed once through a scraped surface heat exchanger such as a double drum dryer in which the drums were heated with steam under a pressure of 100 lbs. per square inch, whereby 100% gelatination of the starch and drying of the mass to a moisture content of 8% was effected and the dried mass was then ground to a size whereby 100% was —40 mesh, at least 70% was —50 mesh, and at least 50% was —70 mesh. The powdered flour had a reducing sugar content of 1.3% and a modified rehydration factor of 18.

The said potato flour was admixed with 120 kilos of mashed potato flakes having a reducing sugar content of 1.9 by weight and a modified rehydration factor of 4 to obtain a final mixture having a reducing sugar content of 1.5% and a modified rehydration factor of 14. 100 kilos of the said mixture was then made into a dough by the addition of 5 kilos of salt and 35 kilos of water. The dough was extruded under pressure into coherent bands and the bands were cut into piecelets of about 30 mm. and dried to a moisture content of 8%. This intermediate product or "half material" may be fried immediately or shipped to a frying point and then fried into the final crispy expanded food product. When the piecelets are fried for about 15 seconds in fat at 180° C., a crispy expanded food product having a straw yellow color and a weight-to-volume ratio of 0.14 and an agreeable taste and bite is produced.

EXAMPLE II

A mixture of low grade potatoes (culls) of several varieties having a solids content of 23% and a reducing sugar content of 5.0% based on the solids content were lightly lye peeled and then ground in a hammer mill to obtain a low viscosity, thin slurry of potato, and sufficient sodium bisulfite was added to obtain an $SO_2$ content of 200 p.p.m. 300 kilos of the low viscosity slurry were admixed with 100 kilos of raw potato starch to obtain a pumpable mass with a solids content slightly below 40%. The resulting slurry was passed through a drum drier having one big drum and 3 smaller application drums heated with steam under pressure of 100 lbs./sq. in. to obtain a fully gelatinized potato flour having a moisture content of 9%. After grinding as in Example I, the potato flour had a reducing sugar content of 2.1% and a modified rehydration factor of 18.

The resulting potato flour was admixed with 40 kilos of the potato flakes used in Example I to obtain a potato flour having a reducing sugar content of 2.0% and a modified rehydration factor of 15. As in Example I, the flour was used to produce a crispy expanded food product having a golden brown color and a distinct potato taste, good bite and a weight to volume ratio of about 0.14.

In place of raw potato starch used in the above examples, other starches such as cornstarch, tapioca and the like may be used.

EXAMPLE III

Field crop potatoes of the Bintje variety containing 22% solids content and 5.4 reducing sugar based on the solids content were washed and lye peeled. The peeled potatoes were then ground in a hammer mill to obtain a thin slurry of finely divided potatoes and sufficient sodium bisulfite was added thereto to obtain an $SO_2$ content of 250 p.p.m. 300 kilos of the said slurry were admixed with 150 kilos of raw potato starch to obtain a mass containing about 48% solids content and which was still transportable by a pump. The said mass was passed once through a scraped surface heat exchanger such as a double drum dryer in which the drums were heated with steam under a pressure of 100 lbs. per square inch, whereby 100% gelatinization of the starch and drying of the mass to a moisture content of 8% was effected and the dried mass was then ground to a size whereby 100% was −40 mesh, at least 70% was −50 mesh, and at least 50% was −70 mesh. The powdered flour had a reducing sugar content of 1.7% and a modified rehydration factor of 18.

200 kilos of the said potato flour was admixed with 200 kilos of mashed potato flakes having a reducing sugar content of 1.9 by weight and a modified rehydration factor of 4 to obtain a final mixture having a reducing sugar content of 1.8% and a modified rehydration factor of 11. 100 kilos of the said mixture was then made into a dough by the addition of 5 kilos of salt and 30 kilos of water. The dough was extruded under pressure into coherent bands and the bands were cut into piecelets of about 30 mm. and dried to a moisture content of 8%. This intermediate product or "half material" may be fried immediately or shipped to a frying point and then fried into the final crispy expanded food product. When the piecelets are fried for about 15 seconds in a fat at 180 C., a crispy expanded food product having a straw yellow color and a weight-to-volume ratio of 0.17 and an agreeable taste and bite is produced.

Various modifications of the present process of the invention may be made without departing from the spirit or scope thereof, and it is to be understood that the invention is to be limited only as defined in the appended claims.

I claim:

1. A process for producing an improved crispy expanded fried foodstuff which comprises grinding raw potatoes having a reducing sugar content selected from the group consisting of less than 1% and greater than 2% based on the solids weight in the presence of a bleaching agent to form a liquid slurry of ground potatoes, adding from 5 to 70 parts by weight of raw starch to 100 parts by weight of the slurry to form a liquid mass having a solids content of 22 to 50% and a reducing sugar content of less than that of said slurry of ground potatoes, simultaneously drying and gelatinizing the liquid mas of raw potatoes and raw starch to obtain a potato powder having a moisture content of less than 10%, grinding the potato powder to obtain a potato flour having a swelling power as measured by the modified rehydration factor of over 17, adjusting the reducing sugar content of the flour to about 0.8 to 2.5% by solids weight, and reducing the swelling power to between 6 and 17 as measured by the modified rehydration factor by addition of a low grade potato flour having a swelling power as measured by the modified rehydration factor of less than 7, mixing said flour with water and salt to produce an extrudable mass having a moisture content of 28 to 35%, extruding said mass under pressure to form coherent bands, cutting the bands into piecelets, drying the piecelets to a moisture content between 6 and 10% and frying the dried piecelets in deep fat to produce a crispy expanded foodstuff.

2. The process of claim 1, wherein 25 to 55 parts by weight of raw potato starch are added to 100 parts by weight of the liquid slurry of ground potatoes.

3. The process of claim 1, wherein the bleaching agent is sodium bisulfite.

4. The process of claim 1, wherein the swelling power of the flour is adjusted by addition of an instant potato product thereto.

5. The process of claim 1 wherein the potatoes are peeled before grinding.

6. The process of claim 1 wherein the reducing sugar content of the flour is adjusted to about 1 to 2% by solids weight and the swelling power is reduced to between 8.5 to 15 as measured by the modified rehydration factor.

7. The process of claim 6 wherein said swelling power is reduced to between 8.5 and 11 as measured by the modified rehydration factor.

8. The process of claim 1 wherein said step of simultaneously drying and gelatinizing is conducted on a drum dryer.

9. A process for producing an extrudable mixture of potato flour and water utilizable in the production of a crispy expanded fried foodstuff which consists essentially of grinding raw potatoes having a reducing sugar content of greater than 2% based on the solids weight in the presence of a bleaching agent to form a liquid slurry of ground potatoes, adding from 5 to 70 parts by weight of raw starch to 100 parts by weight of the slurry to form a liquid mass having a solids content of 22 to 50% and a reducing sugar content of less than that of said slurry of ground potatoes, simultaneously drying and gelatinizing the liquid mass of raw potatoes and raw starch to obtain a potato powder having a moisture content of less than 10%, grinding the potato powder to obtain a potato flour having a swelling power as measured by the modified rehydration factor of over 17, adjusting the reducing sugar content of the flour to about 1 to 2% by solids wieght and reducing the swelling power to between 8.5 and 15 as measured by the modified rehydration factor by addition of a low grade potato flour having a swelling power, as measured by the modified rehydration factor, of less than 7, mixing said flour with water and salt to recover an extrudable mixture having a moisture content of 28 to 35%.

References Cited

UNITED STATES PATENTS 2,863,770    12/1971    Spieser    99—100 X

A. LOUIS MONACELL, Primary Examiner

W. A. SIMONS, Assistant Examiner

U.S. Cl. X.R.

99—207